United States Patent
Ozato et al.

(10) Patent No.: US 10,188,125 B2
(45) Date of Patent: Jan. 29, 2019

(54) COFFEE CONCENTRATE COMPOSITION

(71) Applicant: KAO CORPORATION, Tokyo (JP)

(72) Inventors: Naoki Ozato, Sumida-ku (JP); Tatsuya Kusaura, Saitama (JP)

(73) Assignee: KAO CORPORATION, Tokyo (JP)

( * ) Notice: Subject to any disclaimer, the term of this patent is extended or adjusted under 35 U.S.C. 154(b) by 131 days.

(21) Appl. No.: 15/102,464

(22) PCT Filed: Dec. 17, 2014

(86) PCT No.: PCT/JP2014/083394
§ 371 (c)(1),
(2) Date: Jun. 7, 2016

(87) PCT Pub. No.: WO2015/093522
PCT Pub. Date: Jun. 25, 2015

(65) Prior Publication Data
US 2018/0160696 A1 Jun. 14, 2018

(30) Foreign Application Priority Data
Dec. 18, 2013 (JP) .................................. 2013-261249

(51) Int. Cl.
A23F 5/28 (2006.01)
A23F 5/24 (2006.01)
A23F 5/18 (2006.01)
A23F 5/20 (2006.01)

(52) U.S. Cl.
CPC ................ *A23F 5/243* (2013.01); *A23F 5/18* (2013.01); *A23F 5/20* (2013.01)

(58) Field of Classification Search
CPC ........ A23V 2002/00; A23V 2250/2108; A23F 5/243; A23F 5/18; A23F 5/24; A23F 5/26; A23F 5/166; A23F 5/28; A23F 5/00; A23F 5/125
USPC ......................................... 426/590, 594, 658
See application file for complete search history.

(56) References Cited

U.S. PATENT DOCUMENTS

| | | |
|---|---|---|
| 5,242,700 A | 9/1993 | Schlecht |
| 2007/0160726 A1 | 7/2007 | Fujii et al. |
| 2013/0216685 A1 | 8/2013 | Yamamoto et al. |
| 2013/0243929 A1 | 9/2013 | Matsui |

FOREIGN PATENT DOCUMENTS

| | | |
|---|---|---|
| JP | 5-120545 A | 5/1993 |
| JP | 5-219890 A | 8/1993 |
| JP | 2001-78670 A | 3/2001 |
| JP | 2001-78670 A | 3/2001 |
| JP | 2006-204192 A | 8/2006 |
| JP | 3839831 B2 | 8/2006 |
| JP | 2010-178664 A | 8/2010 |
| JP | 2010-233485 A | 10/2010 |
| JP | 2011-67151 A | 4/2011 |
| JP | 2011-182749 A | 9/2011 |
| JP | 2013-226106 A | 11/2013 |
| WO | 2012/046766 A1 | 4/2012 |
| WO | 2012/070578 A1 | 5/2012 |

OTHER PUBLICATIONS

Debry, Gerard, Coffee and Health, John Libbey Eurotext, 1994, p. 74 (Year: 1994).*
E. Angelucci, et al., "Chemical and Sensory Evaluation of the Main Brazilian Instant Coffee", Sixieme Colloque International Sur La Chimie Des Cafes Verts, Torrefies Et Leurs Derives, Total 7 Pages, 1973.
International Search Report dated Mar. 17, 2015 in PCT/JP14/083394 Filed Dec. 17, 2014.
Food composition table 2015 edition in Japan, "Chapter 2 Standard Tables of Food Composition in Japan", Japan Ministry of Education, Culture, Sports, Science and Technology, URL:http://www.mext.go.jp/component/a_menu/science/detail/_icsFiles/afieldfile/2017/02/16/1365343_1-0216r9.pdf (with machine translation).
GNPD-Low Sugar Milk Coffee Drink Apr. 2013 (with machine translation).
Office Action dated Aug. 14, 2018 issued in corresponding Japanese application 2014-255094 (with partial translation) citing documents AO and AW-AX therein.

* cited by examiner

*Primary Examiner* — Hong T Yoo
(74) *Attorney, Agent, or Firm* — Oblon, McClelland, Maier & Neustadt, L.L.P.

(57) ABSTRACT

A concentrated coffee composition comprising the following components (A), (B) and (C);
(A) chlorogenic acids,
(B) total sugar, and
(C) caffeine,
in which a mass ratio of the component (A) and the component (B), [(B)/(A)], is from 1.2 to 5, and a mass ratio of the component (A) and the component (C), [(C)/(A)], is 0.5 or less, and (F) Brix is 5% or more.

9 Claims, No Drawings

COFFEE CONCENTRATE COMPOSITION

FIELD OF THE INVENTION

The present invention relates to a concentrated coffee composition.

BACKGROUND OF THE INVENTION

Coffee beverages have attracted attention for refresh function and physiological functions of chlorogenic acids contained therein. With an increase in attention, their consumption tends to increase. Fresh coffee beverages are rich and extremely excellent in taste and flavor intrinsic to coffee; while their extraction processes are not convenient and waste disposal or the like is nuisance. Then, to improve convenience, a coffee extract solution is concentrated to prepare a concentrate or powdered to prepare instant coffee. Such concentrated coffee compositions have been developed and widely used.

Recently, concentrated coffee compositions improved in additional value from a different angle from convenience have been proposed. For example, a soluble coffee, which has a reduced amount of hydroxyhydroquinone and improved physiological functions of chlorogenic acids (Patent Literature 1), and an aroma-enriched instant coffee, which is prepared by blending a first extract solution obtained by extracting roasted coffee beans in the atmospheric pressure and a second extract solution obtained by extracting them under pressure, concentrating the resulting blend to a predetermined concentration, adding an aroma-comprising concentrate obtained by condensing the vapor vaporized from the first extract solution, to the concentrated blend, and powdering the resulting mixture (Patent Literature 2), are known.

(Patent Literature 1) JP-A-2006-204192
(Patent Literature 2) JP-A-5-219890

SUMMARY OF THE INVENTION

The present invention provides a concentrated coffee composition comprising the following components (A), (B) and (C);
 (A) chlorogenic acids,
 (B) total sugar, and
 (C) caffeine,
in which a mass ratio of the component (A) and the component (B), [(B)/(A)], is from 1.2 to 5 and a mass ratio of the component (A) and the component (C), [(C)/(A)], is 0.5 or less, and (F) Brix is 5% or more.

DETAILED DESCRIPTION OF THE INVENTION

The present inventors enriched chlorogenic acids in a concentrated coffee composition in order to sufficiently exert physiological function of chlorogenic acids. When they drunk it after reduction, they found that sourness, sweetness or richness was insufficient or coarseness was felt. It turned out that taste and flavor balance is broken and taste and flavor intrinsic to coffee is easily broken.

The present invention relates to a concentrated coffee composition comprising chlorogenic acids at high concentrations, and excellent in taste and flavor intrinsic to coffee while having satisfactory sourness, sweetness and richness and reduced coarseness.

As the results of investigation, the present inventors found that a concentrated coffee composition excellent in taste and flavor balance while having satisfactory sourness, sweetness and richness and less coarseness, can be obtained by controlling the mass ratio of total sugar and chlorogenic acids and the mass ratio of caffeine and chlorogenic acids to fall within predetermined ranges in a concentrated coffee composition having a Brix of 5 or more.

According to the present invention, it is possible to provide a concentrated coffee composition comprising chlorogenic acids at high concentrations and excellent in taste and flavor intrinsic to coffee while having satisfactory sourness, sweetness and richness and less coarseness.

The concentrated coffee composition of the present invention is obtained by concentrating or drying a coffee extract solution obtained from roasted coffee beans and has a higher Brix than coffee beverages generally taken. Note that, the "concentrated coffee composition" described in the specification includes instant coffees and does not include roasted coffee beans.

As the form of the concentrated coffee composition of the present invention, e.g., liquid, powder, granule and tablet can be mentioned and the form can be appropriately selected from them. For example, if the concentrated coffee composition of the present invention is a liquid, the composition may be a portion-type dilution beverage. Whereas, if the concentrated coffee composition of the present invention is a powder, it is suitable for preparing instant coffee, and its form includes a one requiring measurement by a spoon, a package suitable for brewing/infusing or a stick-like package containing one-cup dose.

In the concentrated coffee composition of the present invention, Brix (F) is 5% or more. In view of handling, Brix is preferably 7% or more, more preferably 7.5% or more and even more preferably 8% or more. Note that the upper limit value of Brix (F), although it is not particularly limited, is, in view of production efficiency, preferably 99%, more preferably 98% and even more preferably 97%. The range of the Brix (F) is preferably from 5 to 99%, more preferably from 7 to 99%, more preferably from 7.5 to 98% and even more preferably from 8 to 97%. The term "Brix" as used herein refers to a value measured by a sugar refractometer and specified by a value corresponding to the percentage by mass of an aqueous sucrose solution at 20° C., more specifically, a value which can be measured by the method described in Examples described later.

When the concentrated coffee composition of the present invention is a liquid, the dry solids is preferably 5.6% by mass or more, more preferably 6.0% by mass or more and even more preferably 6.4% by mass or more; and preferably 80.0% by mass or less, more preferably 75.0% by mass or less and even more preferably 70.0% by mass or less. The range of the dry solids is preferably from 5.6 to 80.0% by mass, more preferably from 6.0 to 75.0% by mass and even more preferably from 6.4 to 70.0% by mass. If the concentrated coffee composition of the present invention is a solid, the dry solids is preferably 90.0% by mass or more, more preferably 93.0% by mass or more and even more preferably 96.0% by mass or more. In view of oxidation of a lipid, the dry solids is preferably 100.0% by mass or less, more preferably 99.5% by mass or less and even more preferably 99.0% by mass or less. The range of the dry solids is preferably from 90.0 to 100.0% by mass, more preferably from 93.0 to 99.5% by mass and even more preferably from 96.0 to 99.0% by mass. The term "dry solids" as used herein refers to the residue obtained by drying a sample in an electric constant-temperature dryer of 105° C. for 3 hours to remove volatile substances.

The concentrated coffee composition of the present invention contains chlorogenic acids as a component (A). The term "chlorogenic acids" as used herein is a general term collectively encompassing: monocaffeoylquinic acids including 3-caffeoylquinic acid, 4-caffeoylquinic acid, and 5-caffeoylquinic acid; monoferuloylquinic acids including 3-feruloylquinic acid, 4-feruloylquinic acid, and 5-feruloylquinic acid; and dicaffeoylquinic acids (E) including 3,4-dicaffeoylquinic acid, 3,5-dicaffeoylquinic acid, and 4,5-dicaffeoylquinic acid. In the present invention, it is sufficient to contain at least one out of the nine kinds of chlorogenic acids.

In the concentrated coffee composition of the present invention, the content of the component (A) which is specified as the ratio of the component (A) and Brix (F), [(F)/(A) (% by mass)], is preferably from 9 to 15. To enhance richness, the content is preferably 10 or more, more preferably 10.5 or more and even more preferably 11 or more. To suppress coarseness, the content is preferably 14 or less, more preferably 13.5 or less and even more preferably 13 or less. The range of the ratio [(F)/(A)], is preferably from 10 to 14, more preferably from 10.5 to 13.5 and even more preferably from 11 to 13. Note that the content of the component (A) is defined based on the total amount of 9 types of chlorogenic acids as mentioned above. The component (A) is analyzed in accordance with the method described in Examples described later.

In the concentrated coffee composition of the present invention, the content of chlorogenic acids in a solution prepared by diluting the concentrated coffee composition with water so as to obtain a Brix (F) of 3.0% is preferably 0.1% by mass or more, more preferably 0.15% by mass or more, more preferably 0.2% by mass or more and even more preferably 0.24% by mass or more, in view of sourness reduction and physiological effect; and preferably 0.5% by mass or less, more preferably 0.4% by mass or less, more preferably 0.35% by mass or less, more preferably 0.3% by mass or less and even more preferably 0.28% by mass or less in view of sourness reduction. The range of the content of chlorogenic acids in a solution prepared by diluting the concentrated coffee composition with water so as to obtain a Brix of 3.0% is preferably from 0.1 to 0.5% by mass, more preferably from 0.15 to 0.4% by mass, more preferably from 0.2 to 0.35% by mass, more preferably from 0.2 to 0.3% by mass and even more preferably from 0.24 to 0.28% by mass.

The ratio of dicaffeoylquinic acid (E) in chlorogenic acids (A), [(E)/(A)], is preferably 0.05 or more, more preferably 0.08 or more and even more preferably 0.1 or more on a mass basis, in view of physiological effect; and, in view of suppression of precipitation, is preferably 0.3 or less, more preferably 0.25 or less, more preferably 0.2 or less and even more preferably 0.15 or less. The range of the ratio [(E)/(A)] on a mass basis is preferably from 0.05 to 0.3, more preferably from 0.08 to 0.25, more preferably from 0.1 to 0.2 and even more preferably from 0.1 to 0.15. Note that, the content of the dicaffeoylquinic acid (E) is defined based on the total amount of three types described above.

The concentrated coffee composition of the present invention contains total sugar as a component (B). The term "total sugar" as used herein refers to saccharides and polysaccharides contained in the concentrated coffee composition, more specifically, monosaccharides such as glucose and fructose; oligosaccharides such as sucrose, maltose and lactose; and polysaccharides such as starch and hemicellulose. Note that, the content of the component (B) is a value obtained by hydrolyzing carbohydrate with an inorganic acid and calculating the total amount of resultant reduction sugar in terms of glucose. The component (B) is analyzed in accordance with the method described in Examples described later.

In the concentrated coffee composition of the present invention, the content of the component (B) which is specified as the mass ratio of the component (B) to the component (A), [(B)/(A)], is from 1.2 to 5. In view of enhancement of richness, the mass ratio is preferably 1.5 or more, more preferably 2 or more and even more preferably 2.9 or more; and, in view of physiological effect and suppression of coarseness, the mass ratio is preferably 4.7 or less, more preferably 4.5 or less, more preferably 4.3 or less and even more preferably 4 or less. The range of the mass ratio [(B)/(A)] is preferably from 1.5 to 4.7, more preferably from 2 to 4.5, more preferably from 2.9 to 4.3 and even more preferably from 2.9 to 4.

The content of the component (B) in a solution prepared by diluting the concentrated coffee composition of the present invention with water so as to obtain a Brix of 3.0% is preferably 0.4% by mass or more, more preferably 0.45% by mass or more, more preferably 0.5% by mass or more, more preferably 0.55% by mass or more and even more preferably 0.6% by mass or more in view of enhancement of richness; and, in view of physiological effects and precipitation, the content is preferably 1.5% by mass or less, more preferably 1.3% by mass or less, more preferably 1.1% by mass or less, more preferably 0.9% by mass or less and even more preferably 0.8% by mass or less. The range of the content of the component (B) in a solution prepared by diluting the concentrated coffee composition with water so as to obtain a Brix of 3.0% is preferably from 0.4 to 1.5% by mass, more preferably from 0.45 to 1.3% by mass, more preferably from 0.5 to 1.1% by mass, more preferably from 0.55 to 0.9% by mass and even more preferably from 0.6 to 0.8% by mass.

The concentrated coffee composition of the present invention contains caffeine as a component (C).

In the concentrated coffee composition of the present invention, the content of the component (C) is specified as the mass ratio of the component (C) to the component (A), [(C)/(A)], and the mass ratio is 0.5 or less. In view of enhancement of sweetness, reduction of coarseness and hygroscopicity, the mass ratio is preferably 0.4 or less, more preferably 0.3 or less, more preferably 0.2 or less, more preferably 0.17 or less and even more preferably 0.15 or less. Note that, the mass ratio [(C)/(A)] may be 0; however, in view of production efficiency, the mass ratio is preferably 0.00001 or more, more preferably 0.00003 or more, more preferably 0.0001 or more, more preferably 0.0003 or more and even more preferably 0.001 or more. The range of the mass ratio [(C)/(A)] is preferably from 0.00001 to 0.4, more preferably from 0.00003 to 0.3, more preferably from 0.0001 to 0.2, more preferably from 0.0003 to 0.17 and even more preferably from 0.001 to 0.15. Note that the component (C) is analyzed in accordance with the method described in Examples described later.

The content of the component (C) in a solution prepared by diluting the concentrated coffee composition of the present invention with water so as to obtain a Brix of 3.0% is, in view of enhancement of sweetness and reduction of coarseness, preferably 0.1% by mass or less, more preferably 0.08% by mass or less, more preferably 0.06% by mass or less, more preferably 0.05% by mass or less and even more preferably 0.04% by mass or less. Note that, the content of the component (C) may be 0% by mass; in view of bitterness, the content is preferably 0.0001% by mass or more, more preferably 0.0003% by mass or more, more preferably 0.001% by mass or more, more preferably 0.003% by mass or more and even more preferably 0.01% by mass or more. The range of the content of the caffeine (C) in a solution prepared by diluting the concentrated coffee composition with water so as to obtain a Brix of 3.0% is preferably from 0.0001 to 0.1% by mass, more preferably from 0.0003 to 0.08% by mass, more preferably from 0.001 to 0.06% by mass, more preferably from 0.003 to 0.05% by mass and even more preferably from 0.01 to 0.04% by mass.

The concentrated coffee composition of the present invention may contain hydroxyhydroquinone as a component (D).

The content of the component (D) in the concentrated coffee composition of the present invention is specified as the mass ratio of the component (D) to the component (A), [(D)/(A)], and the mass ratio is, in view of physiological effect and reduction of coarseness, preferably $5 \times 10^{-4}$ or less, more preferably $4 \times 10^{-4}$ or less, more preferably $1 \times 10^{-4}$ or less, more preferably $5 \times 10^{-5}$ or less, more preferably $3 \times 10^{-5}$ or less and even more preferably $2 \times 10^{-5}$ or less. Note that, the mass ratio [(D)/(B)] may be 0; in view of production efficiency, the mass ratio is preferably $1 \times 10^{-7}$ or more, more preferably $1 \times 10^{-6}$ or more and even more preferably $2 \times 10^{-6}$ or more. The range of the mass ratio [(D)/(A)] is preferably from $1 \times 10^{-7}$ to $5 \times 10^{-4}$, more preferably from $1 \times 10^{-7}$ to $4 \times 10^{-4}$, more preferably from $1 \times 10^{-7}$ to $1 \times 10^{-4}$, more preferably from $1 \times 10^{-6}$ to $5 \times 10^{-5}$, more preferably from $2 \times 10^{-6}$ to $3 \times 10^{-5}$ and even more preferably from $2 \times 10^{-6}$ to $2 \times 10^{-5}$. Note that, the component (D) is analyzed in accordance with the method described in Examples described later.

The content of the component (D) in a solution prepared by diluting the concentrated coffee composition of the present invention with water so as to obtain a Brix of 3.0% is, in view of physiological effect and reduction of coarseness, preferably $1 \times 10^{-4}$% by mass or less, more preferably $1 \times 10^{-5}$% by mass or less, more preferably $5 \times 10^{-5}$% by mass or less and even more preferably $3 \times 10^{-6}$% by mass or less. Note that, the content of the component (D) may be by mass; in view of production efficiency, the content is preferably $1 \times 10^{-7}$% by mass or more and more preferably $5 \times 10^{-7}$% by mass or more. The range of the content of the component (D) in a solution prepared by diluting the concentrated coffee composition with water so as to obtain a Brix of 3.0% is preferably from $1 \times 10^{-7}$ to $1 \times 10^{-4}$% by mass, more preferably from $1 \times 10^{-7}$ to $1 \times 10^{-5}$% by mass, more preferably from $5 \times 10^{-7}$ to $5 \times 10^{-6}$% by mass and even more preferably from $5 \times 10^{-7}$ to $3 \times 10^{-6}$% by mass.

In the concentrated coffee composition of the present invention, if desired, it may blend one or two or more of additives such as a bitterness suppressing agent, an antioxidant, a flavor, various esters, organic acids, organic acid salts, inorganic acids, inorganic acid salts, inorganic salts, dyes, an emulsifier, a preservative, a seasoning, an acidulant, a quality stabilizer, a pH regulator, a vegetable fat or oil, a protein, a caramel, a finely ground coffee bean and a cocoa powder.

The concentrated coffee composition of the present invention can be taken directly or, if necessary, after reduction operation, e.g., by diluting it with water. Further, two or more of concentrated coffee compositions may be blended. In this case, as long as the mass ratio [(B)/(A)], mass ratio [(C)/(A)] and Brix (F) of the concentrated coffee composition obtained after blending fall within the aforementioned ranges, a concentrated coffee composition other than the concentrated coffee composition defined by the present invention may be blended.

The concentrated coffee composition of the present invention may be provided by being contained in a retort pack formed of a material such as polypropylene (PP), polyethylene terephthalate (PET) and aluminum-deposited film, or in a container like metal cans, PET bottles and glass containers. In this case, the airtight containers can be charged with an inert gas such as nitrogen gas, and be subjected to a heat sterilization. The heat sterilization method is not particularly limited as long as it satisfies the conditions specified in the law (Food Sanitation Act in Japan) to be applied. Examples of the method may include the retort sterilization method, the high-temperature short-time pasteurization (HTST method) and the ultra-high-temperature sterilization method (UHT method) or the like.

The concentrated coffee composition of the present invention can be produced, for example, by subjecting roasted coffee beans to multistage extraction in a pressurized condition at a temperature beyond 100° C., then concentrating the resulting coffee extract solution so as to obtain a Brix of 5% or more and treating the resultant concentrate with activated carbon. After the treatment with activated carbon, the concentrate can be further concentrated to produce a concentrate having a higher concentration.

The type and production area of the roasted coffee beans to be used in extraction are not particularly limited and can be appropriately selected depending upon preference. Two types or more of roasted coffee beans different in type or production area may be used; and a single type of roasted coffee beans is preferably used.

The degree of roast of the roasted coffee beans is not particularly limited. In view of taste and flavor balance of coffee, the degree of roast regarding as an L value, measured by a colorimeter, is preferably from 15 to 35, more preferably from 20 to 33 and even more preferably from 22 to 31. Two types or more of coffee beans different in degree of roast can be used. The term "L value" as used herein refers to the lightness of roasted coffee beans measured by a colorimeter and specified on the basis that black is specified as L value=0 and white as L value=100. Note that, the roasting method and roasting conditions are not particularly limited.

The roasted coffee beans may be unground or ground. The size of the ground roasted coffee beans can be appropriately selected, and for example, the ground roasted coffee beans passing through a 12-mesh Tyler standard sieve and not passing through a 115-mesh Tyler standard sieve can be used.

Next, the roasted coffee beans are subjected to a multistage extraction. The term "multistage extraction" as used herein refers to an extraction process using an apparatus consisting of a plurality of independent extraction towers tandemly connected via pipe. For example, the following process is mentioned. A plurality of independent extraction towers each are charged with roasted coffee beans. An extraction solvent is supplied to a first-stage extraction tower and a coffee extract solution is discharged from the extraction tower. Then, the coffee extract solution discharged from the first-stage extraction tower is supplied to a second-stage extraction tower and a coffee extract solution is discharged from the extraction tower. Note that, if an apparatus has a third and subsequent extraction towers, the operation of supplying the coffee extract solution discharged from a previous-stage extraction tower to a next-stage extraction tower and obtaining a coffee extract solution discharged therefrom is repeated. Then, the coffee extract solution discharged from the final-stage extraction tower is recovered. The term "independent extraction towers" herein does not refer to extraction towers completely discrete from each other but refers to a single extraction tower, which is restricted in transferring roasted coffee beans but has a connection means for feeding an extraction solvent or a coffee extract solution in the course of manufacturing to a next-stage extraction tower. The extraction solvent can be supplied upwardly from a lower portion to an upper portion or downwardly from an upper portion to a lower portion. In this case, the extraction solvent is supplied in a closed system.

The coffee extract solution discharged from an extraction tower may be continuously fed to all extraction towers or once stored in a tank or the like. Alternatively, the coffee extract solution stored may be supplied to a next-stage extraction tower. Note that, the number of stages of the extraction tower to be used in extraction is not particularly limited as long as the number is 2 or more, and can be appropriately selected so as to obtain desired taste and flavor.

As the extraction solvent, water or an aqueous solution comprising an alcohol such as ethanol, or the like is mentioned. Of them, water is preferable in view of taste and flavor. The pH (25° C.) of the extraction solvent, in view of taste and flavor, is preferably from 4 to 10 and more preferably from 5 to 7.

The extraction temperature is not particularly limited as long as it usually exceeds 100° C. In view of taste and flavor, the extraction temperature is preferably from 110 to 170° C., more preferably from 120 to 160° C. and even more preferably from 130 to 150° C.

The extraction pressure (gauge pressure) is, in view of taste and flavor and extraction efficiency, preferably from 0.1 to 1.5 MPa, more preferably from 0.15 to 1.3 MPa and even more preferably from 0.2 to 1.4 MPa.

The amount of roasted coffee beans to be used in extraction is specified as the amount of roasted coffee beans used per 100 g of coffee beverage prepared by reducing the resultant concentrated coffee composition, and is preferably 1 g or more in terms of green beans, more preferably 2.5 g or more and even more preferably 5 g or more. The value in terms of green beans is obtained on the basis that 1 g of roasted coffee beans corresponds to 1.3 g of green coffee beans (newly revised edition, soft drinks, supervised by Japan Soft Drinks Association, published by Korin on Dec. 25, 1989, page 421).

The residence time of an extract solution per stage depends upon e.g., the extraction scale; and the residence time is preferably from 10 minutes to 3 hours and more preferably from 15 minutes to 2 hours.

In the multistage extraction, it is preferable to control the Brix recovery rate (%) obtained by the following formula. The Brix recovery rate is preferably from 30 to 50%, more preferably from 32 to 48% and even more preferably from 34 to 46%.

Brix recovery rate Brix×collected liquid amount (L)/roasted-beans amount (kg)

If multistage extraction is performed in a pressurized condition, the resulting coffee extract solution has the soluble solids and chlorogenic acids at high concentrations and is different in taste and flavor, as compared to multistage extraction in a normal pressure condition and drip extraction.

Next, the coffee extract solution is preferably concentrated. Concentration may be performed by a process and an apparatus known in the art. Examples of the process include, but are not particularly limited to, vacuum concentration and reverse osmosis membrane concentration.

Next, the concentrate is preferably treated with activated carbon. In view of enhancement of sweetness, reduction of coarseness and selective removal of hydroxyhydroquinone, an activated carbon preferably has an average pore size, measured by the MP method, of 5 Å or less, more preferably from 2 to 5 Å and even more preferably from 3 to 5 Å.

Examples of a raw material of the activated carbon include a wood material, coal, and palm shell or the like, and of those, use of palm shell activated carbon is preferred. Furthermore, activated carbon activated by a gas such as water vapor is preferably used.

Examples of commercially available products of such activated carbons include Sirasagi WH2c LSS (Japan EnviroChemicals, Ltd.), Taiko CW (FUTAMURA CHEMICAL CO., LTD.), Kuraray coal GW and Kuraray coal GW-H (KURARAY CHEMICAL CO., LTD.).

The amount of activated carbon used is, in view of enhancement of sweetness, reduction of coarseness and selective removal of hydroxyhydroquinone, preferably from 0.05 to 0.7 times by mass, more preferably from 0.08 to 0.6 times by mass and even more preferably from 0.1 to 0.5 times by mass relative to the numeric value obtained by multiplying the mass of a coffee extract solution by Brix (%)/100.

Examples of the treatment with activated carbon include a batch method or a column flow-through method.

The batch method may be carried out by adding activated carbon to a coffee extract solution, stirring at from 10 to 100° C. for from 0.5 minutes to 5 hours, and thereafter, removing activated carbon. The column flow-through method may be carried out by charging a column with activated carbon, supplying a coffee extract solution from the lower portion or upper portion of the column and obtaining the coffee extract solution discharged from the opposite portion. The flow speed of a coffee extract solution through the column can be appropriately selected; and the flow speed is usually from 10 to 120 mm/min in terms of a linear speed, preferably from 10 to 100 mm/min and more preferably from 10 to 90 mm/min. The temperature of the coffee extract solution to be passed through is usually from 10 to 100° C. Note that, in the present invention, before a concentrate is treated, activated carbon may be subjected to a heat sterilization. As the heat sterilization method, the same heat sterilization methods as described above may be mentioned.

The solution treated with activated carbon may be concentrated. Concentration is carried out by a process and an apparatus known in the art. Examples of the concentration process include, but are not particularly limited, vacuum concentration and reverse osmosis membrane concentration or the like. If a powder form is desired, the concentrate can be processed into instant coffee by e.g., spray drying and freeze drying.

With respect to the aforementioned embodiment, the present invention discloses the following concentrated coffee composition.

<1>

A concentrated coffee composition comprising the following components (A), (B) and (C);

(A) chlorogenic acids,
(B) total sugar, and
(C) caffeine, in which a mass ratio of the component (A) and the component (B), [(B)/(A)], is from 1.2 to 5, and a mass ratio of the component (A) and the component (C), [(C)/(A)], is 0.5 or less, and Brix is 5% or more.

<2>

The concentrated coffee composition according to <1>, in which the Brix is preferably 5% or more, more preferably 7% or more, more preferably 7.5% or more and even more preferably 8% or more; and preferably 99% or less, more preferably 98% or less and even more preferably 97% or less.

<3>

The concentrated coffee composition according to <1> or <2>, in which the Brix is preferably from 5 to 99%, more preferably from 7 to 99%, more preferably from 7.5 to 98% and even more preferably from 8 to 97%.

<4>

The concentrated coffee composition according to any one of <1> to <3>, in which if the concentrated coffee composition is a liquid, dry solids are preferably 5.6% by mass or more, more preferably 6.0% by mass or more and even more preferably 6.4% by mass or more; and preferably 80.0% by mass or less, more preferably 75.0% by mass or less and even more preferably 70.0% by mass or less.

<5>

The concentrated coffee composition according to any one of <1> to <4>, in which if the concentrated coffee composition is a liquid, the dry solids are preferably from 5.6 to 80.0% by mass, more preferably from 6.0 to 75.0% by mass and even more preferably from 6.4 to 70.0% by mass.

<6>

The concentrated coffee composition according to any one of <1> to <5>, in which if the concentrated coffee composition is a solid, the dry solids are preferably 90.0% by mass or more, more preferably 93.0% by mass or more and even more preferably 96.0% by mass or more; and preferably 100.0% by mass or less, more preferably 99.5% by mass or less and even more preferably 99.0% by mass or less.

<7>

The concentrated coffee composition according to any one of <1> to <6>, in which if the concentrated coffee composition is a solid, the dry solids are preferably from 90.0 to 100.0% by mass, more preferably from 93.0 to 99.5% by mass and even more preferably from 96.0 to 99.0% by mass.

<8>

The concentrated coffee composition according to any one of <1> to <7>, in which the chlorogenic acids (A) are at least one selected from the group preferably consisting of 3-caffeoylquinic acid, 4-caffeoylquinic acid, 5-caffeoylquinic acid, 3-feruloylquinic acid, 4-feruloylquinic acid, 5-feruloylquinic acid, 3,4-dicaffeoylquinic acid, 3,5-dicaffeoylquinic acid and 4,5-dicaffeoylquinic acid.

<9>

The concentrated coffee composition according to any one of <1> to <8>, in which a ratio of the mass of component (A) and Brix (F), [(F)/(A)], is preferably 9 or more, more preferably 10 or more, more preferably 10.5 or more and even more preferably 11 or more; and preferably 15 or less, more preferably 14 or less, more preferably 13.5 or less and even more preferably 13 or less.

<10>

The concentrated coffee composition according to any one of <1> to <9>, in which the ratio of the mass of component (A) and Brix (F), [(F)/(A)], is preferably from 9 to 15, more preferably from 10 to 14, more preferably from 10.5 to 13.5 and even more preferably from 11 to 13.

<11>

The concentrated coffee composition according to any one of <1> to <10>, in which a content of the chlorogenic acids (A) in a solution prepared by diluting the concentrated coffee composition with water so as to obtain a Brix of 3.0% is preferably 0.1% by mass or more, more preferably 0.15% by mass or more, more preferably 0.2% by mass or more and even more preferably 0.24% by mass or more; and preferably 0.5% by mass or less, more preferably 0.4% by mass or less, more preferably 0.35% by mass or less, more preferably 0.3% by mass or less and even more preferably 0.28% by mass or less.

<12>

The concentrated coffee composition according to any one of <1> to <11>, in which the content of the chlorogenic acids in a solution prepared by diluting the concentrated coffee composition with water so as to obtain a Brix of 3.0% is preferably from 0.1 to 0.5% by mass, more preferably from 0.15 to 0.4% by mass, more preferably from 0.2 to 0.35% by mass, more preferably from 0.2 to 0.3% by mass and even more preferably from 0.24 to 0.28% by mass.

<13>

The concentrated coffee composition according to any one of <1> to <12>, in which a ratio of a dicaffeoylquinic acid (E) in the chlorogenic acids (A), [(E)/(A)], in terms of a mass basis, is preferably 0.05 or more, more preferably 0.08 or more and even more preferably 0.1 or more; and preferably 0.3 or less, more preferably 0.25 or less, more preferably 0.2 or less and even more preferably 0.15 or less.

<14>

The concentrated coffee composition according to any one of <1> to <13>, in which the ratio of a dicaffeoylquinic acid (E) in the chlorogenic acids (A), [(E)/(A)], in terms of a mass basis, is preferably from 0.05 to 0.3, more preferably from 0.08 to 0.25, more preferably from 0.1 to 0.2 and even more preferably from 0.1 to 0.15.

<15>

The concentrated coffee composition according to <13> or <14>, in which the dicaffeoylquinic acid (E) is at least one selected from the group consisting of 3,4-dicaffeoylquinic acid, 3,5-dicaffeoylquinic acid and 4,5-dicaffeoylquinic acid.

<16>

The concentrated coffee composition according to any one of <1> to <15>, in which the total sugar (B) preferably is saccharides and polysaccharides contained in the concentrated coffee composition, more preferably a monosaccharide (for example, glucose, fructose), an oligosaccharide (for example, sucrose, maltose, lactose) or a polysaccharide (for example, starch, hemicellulose).

<17>

The concentrated coffee composition according to any one of <1> to <16>, in which a mass ratio of the component (A) and the component (B), [(B)/(A)], is preferably 1.5 or more, more preferably 2 or more and even more preferably 2.9 or more; and preferably 4.7 or less, more preferably 4.5 or less, more preferably 4.3 or less and even more preferably 4 or less.

<18>

The concentrated coffee composition according to any one of <1> to <17>, in which the mass ratio of the component (A) and the component (B), [(B)/(A)], is preferably from 1.5 to 4.7, more preferably from 2 to 4.5, more preferably from 2.9 to 4.3 and even more preferably from 2.9 to 4.

<19>
The concentrated coffee composition according to any one of <1> to <18>, in which a content of the component (B) in a solution prepared by diluting the concentrated coffee composition with water so as to obtain a Brix of 3.0% is preferably 0.4% by mass or more, more preferably 0.45% by mass or more, more preferably 0.5% by mass or more, more preferably 0.55% by mass or more and even more preferably 0.6% by mass or more; and preferably 1.5% by mass or less, more preferably 1.3% by mass or less, more preferably 1.1% by mass or less, more preferably 0.9% by mass or less and even more preferably 0.8% by mass or less.

<20>
The concentrated coffee composition according to any one of <1> to <19>, in which the content of the component (B) in a solution prepared by diluting the concentrated coffee composition with water so as to obtain a Brix of 3.0% is preferably from 0.4 to 1.5% by mass, more preferably from 0.45 to 1.3% by mass, more preferably from 0.5 to 1.1% by mass, more preferably from 0.55 to 0.9% by mass and even more preferably from 0.6 to 0.8% by mass.

<21>
The concentrated coffee composition according to any one of <1> to <20>, in which a mass ratio of the component (A) and the component (C), [(C)/(A)], is preferably 0.4 or less, more preferably 0.3 or less, more preferably 0.2 or less, more preferably 0.17 or less and even more preferably 0.15 or less; and preferably 0.00001 or more, more preferably 0.00003 or more, more preferably 0.0001 or more, more preferably 0.0003 or more and even more preferably 0.001 or more, and may be 0.

<22>
The concentrated coffee composition according to any one of <1> to <21>, in which the mass ratio of the component (A) and the component (C), [(C)/(A)], is preferably from 0.00001 to 0.4, more preferably from 0.00003 to 0.3, more preferably from 0.0001 to 0.2, more preferably from 0.0003 to 0.17 and even more preferably from 0.001 to 0.15.

<23>
The concentrated coffee composition according to any one of <1> to <22>, in which a content of the component (C) in a solution prepared by diluting the concentrated coffee composition with water so as to obtain a Brix of 3.0% is preferably 0.1% by mass or less, more preferably 0.08% by mass or less, more preferably 0.06% by mass or less, more preferably 0.05% by mass or less and even more preferably 0.04% by mass or less; and preferably 0.0001% by mass or more, more preferably 0.0003% by mass or more, more preferably 0.001% by mass or more, more preferably 0.003% by mass or more and even more preferably 0.01% by mass or more, and may be 0% by mass.

<24>
The concentrated coffee composition according to any one of <1> to <23>, in which the content of the component (C) in a solution prepared by diluting the concentrated coffee composition with water so as to obtain a Brix of 3.0% is preferably from 0.0001 to 0.1% by mass, more preferably from 0.0003 to 0.08% by mass, more preferably from 0.001 to 0.06% by mass, more preferably from 0.003 to 0.05% by mass and even more preferably from 0.01 to 0.04% by mass.

<25>
The concentrated coffee composition according to any one of <1> to <24>, in which a mass ratio of the hydroxyhydroquinone (D) and the component (A), [(D)/(A)], is preferably $5 \times 10^{-4}$ or less, more preferably $4 \times 10^{-4}$ or less, more preferably $1 \times 10^{-4}$ or less, more preferably $5 \times 10^{-5}$ or less, more preferably $3 \times 10^{-5}$ or less and even more preferably $2 \times 10^{-5}$ or less; and preferably $1 \times 10^{-7}$ or more, more preferably $1 \times 10^{-6}$ or more and even more preferably $2 \times 10^{-6}$ or more, and may be 0.

<26>
The concentrated coffee composition according to any one of <1> to <25>, in which the mass ratio of the hydroxyhydroquinone (D) and the component (A), [(D)/(A)], is preferably from $1 \times 10^{-7}$ to $5 \times 10^{-4}$, more preferably from $1 \times 10^{-7}$ to $4 \times 10^{-4}$, more preferably from $1 \times 10^{-7}$ to $1 \times 10^{-4}$, more preferably from $1 \times 10^{-6}$ to $5 \times 10^{-5}$, more preferably from $2 \times 10^{-6}$ to $3 \times 10^{-5}$ and even more preferably from $2 \times 10^{-6}$ to $2 \times 10^{-5}$ <27>
The concentrated coffee composition according to any one of <1> to <26>, in which a content of the hydroxyhydroquinone (D) in a solution prepared by diluting the concentrated coffee composition with water so as to obtain a Brix of 3.0% is preferably $1 \times 10^{-4}$% by mass or less, more preferably $1 \times 10^{-5}$% by mass or less, more preferably $5 \times 10^{-6}$% by mass or less and even more preferably $3 \times 10^{-6}$% by mass or less; and preferably $1 \times 10^{-7}$% by mass or more and even more preferably $5 \times 10^{-7}$ by mass or more, and may be 0% by mass.

<28>
The concentrated coffee composition according to any one of <1> to <27>, in which the content of the hydroxyhydroquinone (D) in a solution prepared by diluting the concentrated coffee composition with water so as to obtain a Brix of 3.0% is preferably from $1 \times 10^{-7}$ to $1 \times 10^{-4}$% by mass, more preferably from $1 \times 10^{-7}$ to $1 \times 10^{-5}$% by mass, more preferably from $5 \times 10^{-7}$ to $5 \times 10^{-6}$% by mass and even more preferably from $5 \times 10^{-7}$ to $3 \times 10^{-5}$% by mass.

<29>
The concentrated coffee composition according to any one of <1> to <28>, further preferably comprising one or two or more of additives selected from the group consisting of a bitterness suppressing agent, an antioxidant, a flavor, various esters, organic acids, organic acid salts, inorganic acids, inorganic acid salts, inorganic salts, dyes, an emulsifier, a preservative, a seasoning, an acidulant, a quality stabilizer, a pH regulator, a vegetable fat or oil, a protein, a caramel, a finely ground coffee bean and a cocoa powder.

<30>
The concentrated coffee composition according to any one of <1> to <29>, which is preferably taken directly or after diluted with water.

<31>
The concentrated coffee composition according to any one of <1> to <30>, which is preferably packaged in a container.

<32>
The concentrated coffee composition according to <31>, in which the container is preferably a retort pack, a metal can, a PET bottle or a glass container.

<33>
The concentrated coffee composition according to any one of <1> to <32>, which is preferably subjected to heat sterilization.

<34>
The concentrated coffee composition according to <33>, in which the heat sterilization preferably satisfies the conditions specified in the law (Food Sanitation Act in Japan) to be applied, more preferably, is the retort sterilization method, the high-temperature short-time pasteurization (HTST method) or the ultra-high-temperature sterilization method (UHT method).

<35>
The concentrated coffee composition according to any one of <1> to <34>, in which the concentrated coffee composition is preferably provided in the form of liquid, powder, granule or tablet.

<36>
The concentrated coffee composition according to any one of <1> to <35>, in which the concentrated coffee composition is preferably obtained by concentrating or drying a coffee extract solution obtained from roasted coffee beans.

<37>
The concentrated coffee composition according to <36>, in which the coffee extract solution is preferably obtained by subjecting roasted coffee beans to multistage extraction in a pressurized condition at a temperature beyond 100° C.

<38>
The concentrated coffee composition according to any one of <1> to <37>, in which the concentrated coffee composition is produced preferably by subjecting roasted coffee beans to multistage extraction in a pressurized condition at a temperature beyond 100° C., thereafter concentrating a coffee extract solution so as to obtain a Brix of 5% or more, and treating a concentrate with activated carbon.

<39>
The concentrated coffee composition according to any one of <36> to <38>, in which an L value of the roasted coffee beans is preferably from 15 to 35, more preferably from 20 to 33 and even more preferably from 22 to 31.

<40>
The concentrated coffee composition according to any one of <36> to <39>, in which the roasted coffee beans are preferably ground, more preferably have sizes passing through a 12-mesh Tyler standard sieve and not passing through a 115-mesh Tyler standard sieve.

<41>
The concentrated coffee composition according to any one of <36> to <40>, in which a temperature in extraction is preferably beyond 100° C., more preferably from 110 to 170° C., more preferably from 120 to 160° C. and even more preferably from 130 to 150° C.

<42>
The concentrated coffee composition according to any one of <37> to <41>, in which a pressurized condition is preferably from 0.1 to 1.5 MPa in terms of gauge pressure, more preferably from 0.15 to 1.3 MPa and even more preferably from 0.2 to 1.4 MPa.

<43>
The concentrated coffee composition according to any one of <36> to <42>, in which the concentrated coffee composition uses roasted coffee beans in an amount of preferably 1 g or more, in terms of green beans, per 100 g of coffee beverage prepared by reducing the concentrated coffee composition, more preferably 2.5 g or more and even more preferably 5 g or more.

<44>
The concentrated coffee composition according to any one of <37> to <43>, in which in the multistage extraction, the Brix recovery rate (%) obtained by the following formula:

Brix recovery rate (%)=Brix×collected liquid amount (L)/roasted-beans amount (kg)

is preferably controlled to be from 30 to 50%, more preferably from 32 to 48% and even more preferably from 34 to 46%.

<45>
The concentrated coffee composition according to any one of <38> to <44>, which is treated with activated carbon having an average pore size of preferably 5 Å or less, more preferably from 2 to 5 Å and even more preferably from 3 to 5 Å.

<46>
The concentrated coffee composition according to any one of <38> to <45>, in which the activated carbon is preferably derived from sawdust, coal or coconut shell, more preferably coconut activated carbon.

<47>
The concentrated coffee composition according to any one of <38> to <46>, in which the activated carbon is preferably activated carbon activated with water vapor.

<48>
The concentrated coffee composition according to any one of <38> to <47>, in which an amount of activated carbon used is preferably from 0.05 to 0.7 times by mass, more preferably from 0.08 to 0.6 times by mass and even more preferably from 0.1 to 0.5 times by mass relative to the numeric value obtained by multiplying the mass of a coffee extract solution by Brix (%)/100.

<49>
The concentrated coffee composition according to any one of <38> to <48>, in which the treatment with activated carbon is preferably performed by a batch method or a column flow-through method.

<50>
The concentrated coffee composition according to <49>, in which the batch method allows to be in contact with activated carbon preferably at a temperature of from 10 to 100° C. for from 0.5 minutes to 5 hours.

<51>
The concentrated coffee composition according to <49>, in which the column flow-through method allows to pass through a column charged with activated carbon, preferably at a temperature of 10 to 100° C. and at a linear speed of preferably 10 to 120 mm/min, more preferably from 10 to 100 mm/min and even more preferably from 10 to 90 mm/min.

<52>
The concentrated coffee composition according to any one of <1> to <51>, in which two or more of concentrated coffee compositions are blended.

EXAMPLES

1. Analysis of Chlorogenic Acids and Caffeine

HPLC was used as an analyzer. The model numbers of constituent units in the analyzer are as follows:
UV-VIS detector: L-2420 (Hitachi High-Technologies Corporation),
Column oven: L-2300 (Hitachi High-Technologies Corporation),
Pump: L-2130 (Hitachi High-Technologies Corporation),
Autosampler: L-2200 (Hitachi High-Technologies Corporation),
Column: Cadenza CD-C18, 4.6 mm (inner diameter)×150 mm (length), particle diameter: 3 μm (Imtakt Corp.).
Analysis conditions are as follows:
Sample injection volume: 10 μL
Flow rate: 1.0 mL/min
Predetermined wavelength of UV-VIS detector: 325 nm
Predetermined temperature of column oven: 35° C.
Eluent A: 5 (V/V) % acetonitrile solution containing 0.05 M acetic acid, 0.1 mM 1-hydroxyethane-1,1-diphosphonic acid, and 10 mM sodium acetate Eluent B: acetonitrile
Concentration Gradient Conditions

| time | Eluent A | Eluent B |
|---|---|---|
| 0.0 minutes | 100% | 0% |
| 10.0 minutes | 100% | 0% |
| 15.0 minutes | 95% | 5% |
| 20.0 minutes | 95% | 5% |
| 22.0 minutes | 92% | 8% |
| 50.0 minutes | 92% | 8% |
| 52.0 minutes | 10% | 90% |
| 60.0 minutes | 10% | 90% |
| 60.1 minutes | 100% | 0% |
| 70.0 minutes | 100% | 0% |

In HPLC, 1 g of a sample was accurately weighed and increased to 10 mL with eluent A. The resultant was filtered by a membrane filter (GL Chromatodisk 25A, pore diameter: 0.45 μm, GL Sciences Inc.) and then analyzed.

Retention Time (Unit: Minutes) of Nine Chlorogenic Acids
Monocaffeoylquinic acids (3 peaks in total): 5.3, 8.8, 11.6
Monoferuloylquinic acids (3 peaks in total): 13.0, 19.9, 21.0
Dicaffeoylquinic acids (3 peaks in total): 36.6, 37.4, 44.2

From area values for the nine chlorogenic acids determined in the foregoing, the content of the chlorogenic acids was determined in terms of % by mass by using 5-caffeoylquinic acid as a standard substance.

Note that, caffeine was analyzed in the same manner as that for chlorogenic acids, except that the wavelength of UV-VIS detector was set at 270 nm and caffeine was used as a standard substance. The retention time of caffeine was 18.9 minutes.

2. Analysis of Hydroxyhydroquinone

The analysis method for hydroxyhydroquinone is as follows.

As an analyzer, an HPLC-electrochemical detector (coulometric type), i.e., a coularray system (model 5600A, developed and manufactured by ESA (U.S.A.), imported and sold by MC Medical, Inc.) was used.

The names and model numbers of constituent units of the analyzer are as follows:
Analytical cell: Model 5010, CoulArray Organizer,
CoulArray Electronics Module and Software: Model 5600A,
Solvent delivery module: Model 582, Gradient Mixer,
Autosampler: Model 542, Pulse Damper,
Degasser: Degasys Ultimate DU3003,
Column oven: 505.
Column: CAPCELL PAK C18 AQ, 4.6 mm (inner diameter)×250 mm (length), particle diameter: 5 μm (Shiseido Co., Ltd.)
Analysis conditions are as follows:
Sample injection volume: 10 μL
Flow rate: 1.0 mL/min
Applied voltage of electrochemical detector: 200 mV
Predetermined temperature of column oven: 40° C.
Eluent C: 5 (V/V) % methanol solution containing 0.1 (W/V) % phosphoric acid and 0.1 mM 1-hydroxyethane-1,1-diphosphonic acid
Eluent D: 50 (V/V) % methanol solution containing 0.1 (W/V) % phosphoric acid and 0.1 mM 1-hydroxyethane-1,1-diphosphonic acid For preparing Eluents C and D, distilled water for high-performance liquid chromatography (Kanto Chemical Co., Inc.), methanol for high-performance liquid chromatography (Kanto Chemical Co., Inc.), phosphoric acid (guaranteed reagent, Wako Pure Chemical Industries, Ltd.), and 1-hydroxyethane-1,1-diphosphonic acid (60% aqueous solution, Tokyo Kasei Kogyo Co., Ltd.) were used.

Concentration Gradient Conditions

| Time | Eluent C | Eluent D |
|---|---|---|
| 0.0 minutes | 100% | 0% |
| 10.0 minutes | 100% | 0% |
| 10.1 minutes | 0% | 100% |
| 20.0 minutes | 0% | 100% |
| 20.1 minutes | 100% | 0% |
| 50.0 minutes | 100% | 0% |

An analytical sample was prepared as follows:

5 g of a sample was weighed accurately and increased to 10 mL with a 5 (V/V) % methanol solution containing 0.5 (W/V) % phosphoric acid and 0.5 mM 1-hydroxyethane-1,1-diphosphonic acid, and the resulting solution was centrifuged to separate the supernatant as a sample to be analyzed. The supernatant was allowed to pass through Bond Elut SCX (packed weight of solid phase: 500 mg, reservoir capacity: 3 mL, GL Sciences Inc.). A passed solution excluding about 0.5 mL of the initial passed solution was obtained. Immediately upon filtrating the passed solution by a membrane filter (GL chromatodisk 25A, pore size: 0.45 μm, GL Sciences Inc.), the filtrate was subjected to analysis.

In the analysis performed under the above-mentioned conditions, the retention time of hydroxyhydroquinone was 6.38 minutes. From the peak area values obtained, a content was determined in terms of % by mass with reference to hydroxyhydroquinone (Wako Pure Chemical Industries, Ltd.) as a standard substance.

3. Analysis for Total Sugar

To 2.5 g of a sample, 50 mL of ion-exchanged water and 5 mL of 25% hydrochloric acid were added. The mixture was heated in a boiling bath for 2.5 hours. After cooling, the mixture was neutralized and deproteinized with lead acetate (appropriate amount). The resultant mixture was then diluted with ion-exchanged water up to 100 mL and filtered with a filter paper of No. 5B. The filtrate was deleaded with sodium carbonate (appropriate amount) and then filtered with a filter paper of No. 5B. The filtrate obtained was used as a test solution. The amount of reduction sugar of the test solution was measured by modified Somogyi method (in terms of glucose).

Modified Somogyi Method

In a 100 mL-conical flask with a stopper, 20 mL of the test solution, and 10 mL of $A^1$ solution and several particles of boiling stone were added. An air-cooled tube was attached to the flask and the flask was placed on an electric cooking stove, raised in temperature to a boiling point within 2 minutes. The boiling was continued for 3 minutes. After cooling on ice, 10 mL of solution and 10 mL of $C^1$ solution were added to the resultant. The solution mixture was allowed to stand still at room temperature for 2 minutes and then titrated with $D^1$ solution using 1% soluble starch as an indicator until blue color showing end point was obtained. A sample using ion-exchanged water in place of the test solution was subjected to the same operation and used as a blank.

$A^1$ solution: Solution obtained by dissolving 90 g of sodium potassium tartrate tetrahydrate, 225 g of trisodium phosphate dodecahydrate, 30 g of copper sulfate pentahydrate and 3.5 g of potassium iodate in water and adjusting the total volume to 1 L B¹ solution: Solution obtained by dissolving 90 g of potassium oxalate and 40 g of potassium iodide in water and adjusting the total volume to 1L C¹ solution: 1 mol/L Sulfuric acid solution D¹ solution: 0.05 mol/L Sodium thiosulfate solution 4. Measurement of Brix The Brix of a sample at 20° C. was measured by a saccharimeter (Atago RX-5000, manufactured by Atago).

5. Measurement of L Value

Samples were measured using a colorimeter (spectrophotometer SE2000, manufactured by Nippon Denshoku Industries Co., Ltd.).

6. Sensory Evaluation

Concentrated coffee compositions or blends of concentrated coffee compositions obtained in individual Examples and Comparative Examples described later each were diluted with water so as to obtain a Brix of 3.0% to obtain coffee extracts. These coffee extracts were evaluated for sourness, sweetness, richness and coarseness by five expert panelists based on the following criteria. Through the subsequent consultation by them, final scores were determined and used as evaluation values.

1) Sourness

Provided that the sourness of coffee extract of Example 4 was evaluated as score "5" and the sourness of coffee extract of Comparative Example 1 as score "3", evaluation was performed on a scale of 1 to 5. Specific evaluation criteria are as follows.

5: Feel refreshed
4: Feel slightly refreshed
3: Neither
2: Feel slightly unpleasant
1: Feel unpleasant 2) Sweetness Provided that the sweetness of coffee extract of Example 4 was evaluated as score "5" and the sweetness of coffee extract of Comparative Example 1 as score "1", evaluation was performed on a scale of 1 to 5. Specific evaluation criteria are as follows.

5: Feel adequate sweetness
4: Feel slightly adequate sweetness
3: Neither
2: Feel substantially no sweetness
1: Feel no sweetness 3) Richness Provided that the richness of coffee extract of Example 8 was evaluated as score "5" and the richness of coffee extract of Comparative Example 3 as "1", evaluation was performed on a scale of 1 to 5. Specific evaluation criteria are as follows.

5: Significantly feel richness
4: Slightly feel richness
3: Neither
2: Feel substantially no richness
1: Feel no richness 4) Coarseness Provided that the coarseness of coffee extract of Example 4 was evaluated as score "5" and the coarseness of coffee extract of Comparative Example 1 as score "1", evaluation was performed on a scale of 1 to 5. Specific evaluation criteria are as follows.

5: Feel no coarseness
4: Feel substantially no coarseness
3: Neither
2: Slightly feel coarseness
1: Significantly feel coarseness Evaluation of Hygroscopicity Concentrated coffee compositions or blends of concentrated coffee compositions obtained in Examples 5, 7, 10 to 14, 17 and 18, as well as Comparative Examples 1, 3 and 4 described later each were dried by a spray dryer (DL-41, manufactured by Yamato Scientific Co., Ltd.) in the following conditions to obtain powdered concentrated coffee compositions. Hygroscopicity of these samples were evaluated by the following method.

1) Conditions for Drying

Flow rate: 10 g/minute
Starting temperature: 180° C.
ATMIZING AIR: 0.1 MPa
Liquid nozzle diameter: 711 μm 2) Evaluation Method A saturated aqueous solution of calcium nitrate tetrahydrate (manufactured by Wako Pure Chemical Industries, Ltd.) was poured into a main body of a plastic container. The container was closed airtightly with a plastic cap and stored at 25° C. In this manner, an environment having a humidity of 50% was prepared. Next, samples were stored in the container for five days in the state where they were not in contact with the saturated aqueous solution. Thereafter the appearance of the samples were evaluated in accordance with the following evaluation criteria. After that, the samples were dried by an electric constant-temperature dryer at 105° C. for 3 hours. The mass of the samples was measured before and after storage, and the difference between them was regarded as the water content (% by mass), and used as index for hygroscopicity.

3) Evaluation Criteria for Appearance

3: No change in appearance
2: Small clump is produced
1: Large clump is produced Example 1

Six cylindrical extraction towers (inner diameter 160 mm×height 660 mm) were charged with L26 roasted coffee beans to obtain an amount of 4.2 kg charged per tower. Subsequently, hot water at 110° C. was fed from a lower portion of a first-stage extraction tower to an upper portion. Subsequently, the coffee extract solution discharged from an upper portion of the first-stage extraction tower was fed from a lower portion of a second-stage extraction tower to an upper portion. This operation was repeated in a third and subsequent extraction towers. The coffee extract solution discharged from an upper portion of a sixth-stage extraction tower was rapidly cooled and recovered. Extraction operations were all carried out at a pressure of 0.3 MPa. The obtained extract solution was concentrated by heating under reduced pressure by use of a rotary evaporator (type: N-1100V, manufactured by Tokyo Rikakikai Co., Ltd.) at 0.004 MPa and 50° C. to obtain a concentrated coffee composition having a Brix of 10%. Subsequently, a cylindrical column (inner diameter 72 mm×height 100 mm) was charged with 108 g of activated carbon (Shirasagi WH2C LSS, manufactured by Japan EnviroChemicals, Ltd.) and sterilized at 80° C. for 10 minutes. Thereafter, 3.6 kg of the concentrated coffee composition having a Brix of 10% was fed to the column at 25° C. and a flow rate of 69.1 mL/min, and ion-exchanged water was further fed thereto at 25° C. and a flow rate of 69.1 mL/min. Then, 4 kg of a concentrated coffee composition was obtained (dry solids: 5.9% by mass) from the output port of the column as a final amount of solution taken out therefrom. The obtained concentrated coffee composition was diluted with water so as to obtain a Brix of 3.0%. The coffee extract thus obtained was analyzed and subjected to sensory evaluation. The results are shown in Table 1.

Example 2

A concentrated coffee composition (dry solids: 5.9% by mass) was obtained in the same operation as in Example 1 except that L24 roasted coffee beans were used and extraction temperature was changed to 150° C., and subsequently a coffee extract was prepared in the same operation as in Example 1. The analysis results and the evaluation results of the resultant coffee extract are shown in Table 1.

Example 3

A concentrated coffee composition (dry solids: 7.3% by mass) was obtained in the same operation as in Example 1 except that the extraction temperature was changed to 150° C., the amount of concentrated coffee composition of Brix 10% subjected to the treatment with activated carbon was changed to 10.0 kg; the amount of activated carbon to 100 g; the flow rate through an activated carbon treatment column to 64.0 mL/min; and the amount of solution taken out from the activated carbon treatment column to 10.4 kg. Subsequently, a coffee extract was prepared in the same operation as in Example 1. The analysis results and the evaluation results of the resultant coffee extract are shown in Table 1.

Example 4

A concentrated coffee composition (dry solids: 5.9% by mass) was obtained in the same operation as in Example 1 except that the extraction temperature was changed to 150° C. Subsequently, a coffee extract was prepared in the same operation as in Example 1. The analysis results and the evaluation results of the resultant coffee extract are shown in Table 1.

Example 5

A concentrated coffee composition (dry solids: 4.9% by mass) was obtained in the same operation as in Example 1 except that the extraction temperature was changed to 150° C.; the amount of concentrated coffee composition of Brix 10% subjected to the treatment with activated carbon was changed to 2.0 kg; and the amount of activated carbon to 100 g; the flow rate through an activated carbon treatment column to 64.0 mL/min; and the amount of solution taken out from the activated carbon treatment column to 2.4 kg. Subsequently, a coffee extract was prepared in the same operation as in Example 1. The analysis results and the evaluation results of the resultant coffee extract are shown in Table 1.

Example 6

A concentrated coffee composition (dry solids: 5.9% by mass) was obtained in the same operation as in Example 1 except that the extraction temperature was changed to 150° C.; and the activated carbon was changed to Kuraray coal GW-H (manufactured by KURARAY CHEMICAL CO., LTD.). Subsequently, a coffee extract was prepared in the same operation as in Example 1. The analysis results and the evaluation results of the resultant coffee extract are shown in Table 1.

Example 7

A concentrated coffee composition (dry solids: 5.9% by mass) was obtained in the same operation as in Example 1 except that L30 roasted coffee beans were used and the extraction temperature was changed to 150° C. Subsequently, a coffee extract was prepared in the same operation as in Example 1. The analysis results and the evaluation results of the resultant coffee extract are shown in Table 1.

Example 8

A concentrated coffee composition (dry solids: 5.9% by mass) was obtained in the same operation as in Example 1 except that the extraction temperature was changed to 170° C. Subsequently, a coffee extract was prepared in the same operation as in Example 1. The analysis results and the evaluation results of the resultant coffee extract are shown in Table 1.

Example 9

A concentrated coffee composition was obtained in the same operation as in Example 1 except that the extraction temperature was changed to 150° C. After the composition was dried by a spray dryer (Pulvis GB22: manufactured by Yamato Scientific Co., Ltd.), the resultant powdery concentrated coffee composition (dry solids: 97% by mass) was diluted with water so as to obtain a Brix of 3.0% to prepare a coffee extract. The analysis results and the evaluation results of the resultant coffee extract are shown in Table 1.

Comparative Example 1

A concentrated coffee composition (dry solids: 8.0%; by mass) was obtained in the same operation as in Example 1 except that the extraction temperature was changed to 150° C. and the treatment with activated carbon was not carried out. Subsequently, a coffee extract was prepared in the same operation as in Example 1. The analysis results and the evaluation results of the resultant coffee extract are shown in Table 1.

Comparative Example 2

A concentrated coffee composition (dry solids: 8.0% by mass) was obtained in the same operation as in Example 1 except that the extraction temperature was changed to 170° C. and the treatment with activated carbon was not carried out. Subsequently, a coffee extract was prepared in the same operation as in Example 1. The analysis results and the evaluation results of the resultant coffee extract are shown in Table 1.

Comparative Example 3

L26 roasted coffee beans (400 g) were put in a drip extractor (inner diameter: 73 mm, volume: 11 L). Then, 0.25 kg of hot water at 95° C. was fed from a lower portion of the drip extractor, and the bottom thereof was filled with hot water. Then, hot water at 95° C. was fed through a shower at a rate of 1.25 g/sec. Thereafter, the supply of hot water was terminated and the state was maintained for 10 minutes. The amount of hot water fed was 2.55 times by mass with respect to that of the roasted coffee beans. After maintaining the state, hot water of 95° C. was fed through a shower at a rate of 1.25 g/sec; at the same time, a coffee extract solution was discharged at the same rate. When the amount of coffee extract solution reached 2.4 kg, discharge of the coffee extract solution was terminated. The solution thus taken out was used as a coffee extract solution. Extraction operations were all carried out at normal pressure. The obtained extract solution was concentrated by heating under reduced pressure at 30 torr and 50° C. by use of a rotary evaporator (Type: N-1100V, manufactured by Tokyo Rikakikai Co., Ltd.) to obtain a concentrated coffee composition having a Brix of 10%. Subsequently, a cylindrical column (inner diameter 36 mm×height 160 mm) was charged with 30 g of activated carbon (Shirasagi WH2C LSS, manufactured by Japan EnviroChemicals, Ltd.) and sterilized at 80° C. for 10 minutes. Thereafter, 1.0 kg of the concentrated coffee composition of a Brix of 10% was fed to the column at 25° C. and a flow rate of 19.1 mL/min, and ion-exchanged water was further fed thereto at 25° C. and a flow rate of 19.1 mL/min. Then, 1.2 kg of concentrated coffee composition (dry solids: 5.5% by mass) was obtained from the output of the column as a final amount of solution taken out therefrom. Subsequently, a coffee extract was prepared in the same operation as in Example 1. The obtained coffee extract was analyzed and subjected to sensory evaluation. The results are shown in Table 1.

Comparative Example 4

A concentrated coffee composition (dry solids: 8.0% by mass) was obtained in the same operation as in Comparative Example 3 except that treatment with activated carbon was not carried out. Subsequently, a coffee extract was prepared in the same operation as in Example 1. The analysis results and the evaluation results of the resultant coffee extract are shown in Table 1.

TABLE 1

| | | Example 1 | Example 2 | Example 3 | Example 4 | Example 5 | Example 6 | Example 7 |
|---|---|---|---|---|---|---|---|---|
| Roasted beans | L value of roasted beans | 26 | 24 | 26 | 26 | 26 | 26 | 30 |
| Extraction conditions | Extraction process | Extraction under pressure | Extraction under pressure | Extraction under pressure | Extraction under pressure | Extraction under pressure | Extraction under pressure | Extraction under pressure |
| | Temperature (° C.) | 110 | 150 | 150 | 150 | 150 | 150 | 150 |
| | Pressure (MPa, gauge pressure) | 0.3 | 0.3 | 0.3 | 0.3 | 0.3 | 0.3 | 0.3 |
| Treatment with activated carbon | Type | Shirasagi WH2C LSS | Shirasagi WH2C LSS | Shirasagi WH2C LSS | Shirasagi WH2C LSS | Shirasagi WH2C LSS | Kuraray coal GW-H | Shirasagi WH2C LSS |
| | Amount of activated carbon (% to Brix) | 30 | 30 | 10 | 30 | 50 | 30 | 30 |
| Analysis values of coffee extract[1] | (A) Chlorogenic acids (mg/100 g) | 315.6 | 231.2 | 256.5 | 254.4 | 263.7 | 256.9 | 300.0 |
| | (B) Total sugar (mg/100 g) | 431.8 | 901.0 | 768.0 | 856.2 | 944.5 | 850.0 | 806.0 |
| | (C) Caffeine (mg/100 g) | 33.4 | 25.4 | 42.5 | 26.3 | 24.2 | 26.6 | 26.0 |
| | (D) Hydroxyhydroquinone (mg/kg) | 0.05 | 0.06 | 0.82 | 0.05 | 0.02 | 0.05 | 0.03 |
| | (E) Dicaffeoylquinic acids (mg/100 g) | 40.0 | 21.7 | 29.0 | 28.8 | 29.9 | 29.1 | 34.0 |
| | (F) Brix (%) | 3.00 | 3.00 | 3.00 | 3.00 | 3.00 | 3.00 | 3.00 |
| | Mass ratio (B)/(A) | 1.37 | 3.90 | 2.99 | 3.37 | 3.58 | 3.31 | 2.69 |
| | Mass ratio (C)/(A) | 0.106 | 0.110 | 0.166 | 0.103 | 0.092 | 0.103 | 0.087 |
| | Mass ratio (D)/(A) | 0.0000143 | 0.0000267 | 0.0003184 | 0.0000178 | 0.0000057 | 0.0000178 | 0.0000090 |
| | Mass ratio (E)/(A) | 0.13 | 0.09 | 0.11 | 0.11 | 0.11 | 0.11 | 0.11 |
| | Ratio (F)/(A) | 9.51 | 12.98 | 11.69 | 11.79 | 11.38 | 11.68 | 10.00 |
| Sensory evaluation | Sourness | 3 | 3 | 5 | 5 | 4 | 5 | 3 |
| | Sweetness | 4 | 4 | 3 | 5 | 5 | 5 | 5 |
| | Richness | 3 | 5 | 4 | 4 | 4 | 4 | 3 |
| | Coarseness | 4 | 4 | 3 | 5 | 5 | 5 | 5 |
| Hygroscopicity | Water content (% by mass) | — | — | — | — | 8 | — | 8 |
| | Appearance | — | — | — | — | 3 | — | 3 |

| | | Example 8 | Example 9 | Comparative Example 1 | Comparative Example 2 | Comparative Example 3 | Comparative Example 4 |
|---|---|---|---|---|---|---|---|
| Roasted beans | L value of roasted beans | 26 | 26 | 26 | 26 | 26 | 26 |
| Extraction conditions | Extraction process | Extraction under pressure | Extraction under pressure | Extraction under pressure | Extraction under pressure | Extraction under normal pressure | Extraction under normal pressure |
| | Temperature (° C.) | 170 | 150 | 150 | 170 | 95 | 95 |
| | Pressure (MPa, gauge pressure) | 0.3 | 0.3 | 0.3 | 0.3 | — | — |
| Treatment with activated carbon | Type | Shirasagi WH2C LSS | Shirasagi WH2C LSS | — | — | Shirasagi WH2C LSS | — |
| | Amount of activated carbon (% to Brix) | 30 | 30 | — | — | 30 | — |
| Analysis values of | (A) Chlorogenic acids (mg/100 g) | 244.7 | 254.4 | 293.3 | 282.2 | 354.3 | 337.5 |

TABLE 1-continued

|  |  |  | | | | | | |
|---|---|---|---|---|---|---|---|---|
| coffee extract[1] | (B) | Total sugar (mg/100 g) | 919.0 | 856.2 | 723.8 | 776.9 | 360.6 | 305.0 |
|  | (C) | Caffeine (mg/100 g) | 25.4 | 26.3 | 162.2 | 156.8 | 49.8 | 253.7 |
|  | (D) | Hydroxyhydroquinone (mg/kg) | 0.04 | 0.05 | 8.52 | 7.85 | 0.09 | 13.46 |
|  | (E) | Dicaffeoylquinic acids (mg/100 g) | 27.9 | 28.8 | 33.2 | 32.2 | 33.3 | 31.7 |
|  | (F) | Brix (%) | 3.00 | 3.00 | 3.00 | 3.00 | 3.00 | 3.00 |
|  |  | Mass ratio (B)/(A) | 3.76 | 3.37 | 2.47 | 2.75 | 1.02 | 0.90 |
|  |  | Mass ratio (C)/(A) | 0.104 | 0.103 | 0.553 | 0.556 | 0.141 | 0.752 |
|  |  | Mass ratio (D)/(A) | 0.0000171 | 0.0000178 | 0.00290 | 0.00278 | 0.00002 | 0.00399 |
|  |  | Mass ratio (E)/(A) | 0.11 | 0.11 | 0.11 | 0.11 | 0.09 | 0.09 |
|  |  | Ratio (F)/(A) | 12.26 | 11.79 | 10.23 | 10.63 | 8.47 | 8.89 |
| Sensory evaluation | | Sourness | 4 | 5 | 3 | 3 | 2 | 2 |
|  | | Sweetness | 4 | 5 | 1 | 1 | 4 | 1 |
|  | | Richness | 5 | 4 | 3 | 3 | 1 | 2 |
|  | | Coarseness | 4 | 5 | 1 | 1 | 4 | 1 |
| Hygroscopicity | | Water content (% by mass) | — | — | 15 | — | 11 | 14 |
|  | | Appearance | — | — | 1 | — | 2 | 1 |

[1] Concentrated coffee composition is diluted with water to obtain Brix of 3.0

Example 10

A concentrated coffee composition (dry solids: 7.3% by mass) was obtained in the same operation as in Example 3 except that L24 roasted coffee beans were used and the extraction temperature was changed to 110° C. Subsequently, a coffee extract was prepared in the same operation as in Example 1. The analysis results and the evaluation results of the obtained coffee extract are shown in Table 2 together with the results of Example 2.

Example 11

A concentrated coffee composition (dry solids: 4.9% by mass) was obtained in the same operation as in Example 5 except that L24 roasted coffee beans were used and the extraction temperature was changed to 110° C. Subsequently, a coffee extract was prepared in the same operation as in Example 1. The analysis results and the evaluation results of the obtained coffee extract are shown in Table 2 together with the results of Example 2.

Example 12

A concentrated coffee composition (dry solids: 7.3% by mass) was obtained in the same operation as in Example 3 except that L30 roasted coffee beans were used and the extraction temperature was changed to 170° C. Subsequently, a coffee extract was prepared in the same operation as in Example 1. The analysis results and the evaluation results of the obtained coffee extract are shown in Table 2 together with the results of Example 7.

Example 13

A concentrated coffee composition (dry solids: 4.9% by mass) was obtained in the same operation as in Example 5 except that L30 roasted coffee beans were used and the extraction temperature was changed to 170° C. Subsequently, a coffee extract was prepared in the same operation as in Example 1. The analysis results and the evaluation results of the obtained coffee extract are shown in Table 2 together with the results of Example 7.

TABLE 2

|  |  |  | Example 10 | Example 2 | Example 11 | Example 12 | Example 7 | Example 13 |
|---|---|---|---|---|---|---|---|---|
| Roasted beans | | L value of roasted beans | 24 | 24 | 24 | 30 | 30 | 30 |
| Extraction conditions | | Extraction process | Extraction under pressure | Extraction under pressure | Extraction under pressure | Extraction under pressure | Extraction under pressure | Extraction under pressure |
|  | | Temperature (° C.) | 110 | 150 | 110 | 170 | 150 | 170 |
|  | | Pressure (MPa, gauge pressure) | 0.3 | 0.3 | 0.3 | 0.3 | 0.3 | 0.3 |
| Treatment with activated carbon | | Type | Shirasagi WH2C LSS | Shirasagi WH2C LSS | Shirasagi WH2C LSS | Shirasagi WH2C LSS | Shirasagi WH2C LSS | Shirasagi WH2C LSS |
|  | | Amount of activated carbon (% to Brix) | 10 | 30 | 50 | 10 | 30 | 50 |
| Analysis values of coffee extract[1] | (A) | Chlorogenic acids (mg/100 g) | 233.1 | 231.2 | 239.6 | 302.5 | 300.0 | 311.0 |
|  | (B) | Total sugar (mg/100 g) | 808.1 | 901.0 | 993.9 | 722.9 | 806.0 | 889.1 |
|  | (C) | Caffeine (mg/100 g) | 41.1 | 25.4 | 23.4 | 42.0 | 26.0 | 23.9 |
|  | (D) | Hydroxyhydroquinone (mg/kg) | 1.11 | 0.06 | 0.02 | 0.49 | 0.03 | 0.01 |
|  | (E) | Dicaffeoylquinic acids (mg/100 g) | 21.9 | 21.7 | 22.5 | 34.3 | 34.0 | 35.2 |
|  | (F) | Brix (%) | 3.00 | 3.00 | 3.00 | 3.00 | 3.00 | 3.00 |
|  |  | Mass ratio (B)/(A) | 3.46 | 3.90 | 4.14 | 2.39 | 2.69 | 2.86 |
|  |  | Mass ratio (C)/(A) | 0.177 | 0.110 | 0.098 | 0.140 | 0.087 | 0.078 |
|  |  | Mass ratio (D)/(A) | 0.000478 | 0.0000267 | 0.000009 | 0.000161 | 0.0000090 | 0.000003 |
|  |  | Mass ratio (E)/(A) | 0.09 | 0.09 | 0.09 | 0.11 | 0.11 | 0.11 |
|  |  | Ratio (F)/(A) | 12.87 | 12.98 | 12.53 | 9.92 | 10.00 | 9.65 |

TABLE 2-continued

|  |  | Example 10 | Example 2 | Example 11 | Example 12 | Example 7 | Example 13 |
|---|---|---|---|---|---|---|---|
| Sensory evaluation | Sourness | 5 | 3 | 3 | 5 | 3 | 3 |
|  | Sweetness | 3 | 4 | 5 | 3 | 5 | 5 |
|  | Richness | 4 | 5 | 5 | 3 | 3 | 4 |
|  | Coarseness | 3 | 4 | 5 | 3 | 5 | 5 |
| Hygroscopicity | Water content (% by mass) | 8 | — | 7 | 8 | — | 7 |
|  | Appearance | 3 | — | 3 | 3 | — | 3 |

[1])Concentrated coffee composition is diluted with water to obtain Brix of 3.0

Example 14

Concentrated coffee composition A (dry solids: 6.6% by mass) was obtained in the same operation as in Example 1 except that L16 roasted coffee beans were used; and the extraction temperature was changed to 180° C., the amount of concentrated coffee composition of Brix of 10% subjected to the treatment with activated carbon to 5.0 kg, the amount of activated carbon to 100 g, the flow rate through an activated carbon treatment column to 64.0 mL/min and the amount of solution taken out from the activated carbon treatment column to 5.4 kg.

Subsequently, concentrated coffee composition B (dry solids: 5.9% by mass) was obtained in the same operation as in Example 7.

Then, concentrated coffee composition A and concentrated coffee composition B were blended in a mass ratio (A:B) of 4:6 to obtain a blend of concentrated coffee compositions.

The resultant blend of concentrated coffee compositions was diluted with water so as to obtain a Brix of 3.0% to prepare a coffee extract. The analysis results and the evaluation results of the obtained coffee extract are shown in Table 3.

Example 15

Concentrated coffee composition A (dry solids: 3.0% by mass) was obtained in the same operation as in Example 4 except that L16 roasted coffee beans were used and the extraction temperature was changed to 180° C.

Subsequently, concentrated coffee composition B (dry solids: 5.9% by mass) was obtained in the same operation as in Example 7.

Then, concentrated coffee composition A and concentrated coffee composition B were blended in a mass ratio (A:B) of 2:8 to obtain a blend of concentrated coffee compositions.

The resultant blend of concentrated coffee compositions was diluted with water so as to obtain a Brix of 3.0% to prepare a coffee extract. The analysis results and the evaluation results of the obtained coffee extract are shown in Table 3.

Example 16

Concentrated coffee composition A (dry solids: 5.5% by mass) was obtained in the same operation as in Example 1 except that L16 roasted coffee beans were used; and the extraction temperature was changed to 180° C., the amount of concentrated coffee composition of Brix of 10% subjected to the treatment with activated carbon to 1.8 kg, the amount of activated carbon to 108 g, the flow rate through an activated carbon treatment column to 64.0 mL/min and the amount of solution taken out from the activated carbon treatment column to 2.2 kg.

Subsequently, concentrated coffee composition B (dry solids: 5.9% by mass) was obtained in the same operation as in Example 7.

Then, concentrated coffee composition A and concentrated coffee composition B were blended in a mass ratio (A:B) of 1:9 to obtain a blend of concentrated coffee compositions.

The resultant blend of concentrated coffee compositions was diluted with water so as to obtain a Brix of 3.0% to prepare a coffee extract. The analysis results and the evaluation results of the obtained coffee extract are shown in Table 3.

Example 17

Concentrated coffee composition A (dry solids: 6.6% by mass) was obtained in the same operation as in Example 14.

Subsequently, concentrated coffee composition B (dry solids: 5.9% by mass) was obtained in the same operation as in Example 2.

Then, concentrated coffee composition A and concentrated coffee composition B were blended in a mass ratio (A:B) of 2:8 to obtain a blend of concentrated coffee compositions.

The resultant blend of concentrated coffee compositions was diluted with water so as to obtain a Brix of 3.0% to prepare a coffee extract. The analysis results and the evaluation results of the obtained coffee extract are shown in Table 3.

Example 18

Concentrated coffee composition A (dry solids: 5.5% by mass) was obtained in the same operation as in Example 16.

Subsequently, concentrated coffee composition B (dry solids: 5.9% by mass) was obtained in the same operation as in Example 2.

Then, concentrated coffee composition A and concentrated coffee composition B were blended in a mass ratio (A:B) of 1:9 to obtain a blend of concentrated coffee compositions.

The resultant blend of concentrated coffee compositions was diluted with water so as to obtain a Brix of 3.0% to prepare a coffee extract. The analysis results and the evaluation results of the obtained coffee extract are shown in Table 3.

TABLE 3

|  |  |  | Example 14 | Example 15 | Example 16 | Example 17 | Example 18 |
|---|---|---|---|---|---|---|---|
| Concentrated coffee composition A | Roasted beans | L value of roasted beans | 16 | 16 | 16 | 16 | 16 |
|  | Extraction conditions | Extraction process | Extraction under pressure | Extraction under pressure | Extraction under pressure | Extraction under pressure | Extraction under pressure |
|  |  | Temperature (° C.) | 180 | 180 | 180 | 180 | 180 |
|  |  | Pressure (MPa, gauge pressure) | 0.3 | 0.3 | 0.3 | 0.3 | 0.3 |
|  | Treatment with activated carbon | Type | Shirasagi WH2C LSS | Shirasagi WH2C LSS | Shirasagi WH2C LSS | Shirasagi WH2C LSS | Shirasagi WH2C LSS |
|  |  | Amount of activated carbon (% to Brix) | 20 | 30 | 60 | 20 | 60 |
|  | Analysis values of coffee extract[1] | (A) Chlorogenic acids (mg/100 g) | 10.3 | 6.9 | 0.5 | 10.3 | 0.5 |
|  |  | (B) Total sugar (mg/100 g) | 842.3 | 939.1 | 1035.9 | 842.3 | 1035.9 |
|  |  | (C) Caffeine (mg/100 g) | 24.4 | 4.0 | 0.0 | 24.4 | 0.0 |
|  |  | (D) Hydroxyhydroquinone (mg/kg) | 0.2 | 0.1 | 0.1 | 0.19 | 0.08 |
|  |  | (E) Dicaffeoylquinic acids (mg/100 g) | 0.1 | 0.0 | 0.0 | 0.1 | 0.0 |
|  |  | (F) Brix(%) | 3.00 | 3.00 | 3.00 | 3.00 | 3.00 |
| Concentrated coffee composition B | Roasted beans | L value of roasted beans | 30 | 30 | 30 | 24 | 24 |
|  | Extraction conditions | Extraction process | Extraction under pressure | Extraction under pressure | Extraction under pressure | Extraction under pressure | Extraction under pressure |
|  |  | Temperature (° C.) | 150 | 150 | 150 | 150 | 150 |
|  |  | Pressure (MPa, gauge pressure) | 0.3 | 0.3 | 0.3 | 0.3 | 0.3 |
|  | Treatment with activated carbon | Type | Shirasagi WH2C LSS | Shirasagi WH2C LSS | Shirasagi WH2C LSS | Shirasagi WH2C LSS | Shirasagi WH2C LSS |
|  |  | Amount of activated carbon (% to Brix) | 30 | 30 | 30 | 30 | 30 |
|  | Analysis values of coffee extract[1] | (A) Chlorogenic acids (mg/100 g) | 300.0 | 300.0 | 300.0 | 231.2 | 231.2 |
|  |  | (B) Total sugar (mg/100 g) | 806.0 | 806.0 | 806.0 | 901.0 | 901.0 |
|  |  | (C) Caffeine (mg/100 g) | 26.0 | 26.0 | 26.0 | 25.4 | 25.4 |
|  |  | (D) Hydroxyhydroquinone (mg/kg) | 0.03 | 0.03 | 0.03 | 0.06 | 0.06 |
|  |  | (E) Dicaffeoylquinic acids (mg/100 g) | 34.0 | 34.0 | 34.0 | 21.7 | 21.7 |
|  |  | (F) Brix(%) | 3.00 | 3.00 | 3.00 | 3.00 | 3.00 |
| Blend of concentrated coffee compositions | Blend mass ratio (A:B) of concentrated coffee compositions A and B |  | A:B = 4:6 | A:B = 2:8 | A:B = 1:9 | A:B = 2:8 | A:B = 1:9 |
|  | Analysis values of coffee extract[1] | (A) Chlorogenic acids (mg/100 g) | 184.1 | 241.4 | 270.1 | 187.0 | 208.1 |
|  |  | (B) Total sugar (mg/100 g) | 820.5 | 832.6 | 829.0 | 889.3 | 914.5 |
|  |  | (C) Caffeine (mg/100 g) | 25.3 | 21.6 | 23.4 | 25.2 | 22.9 |
|  |  | (D) Hydroxyhydroquinone (mg/kg) | 0.1 | 0.0 | 0.0 | 0.1 | 0.1 |
|  |  | (E) Dicaffeoylquinic acids (mg/100 g) | 20.4 | 27.2 | 30.6 | 17.4 | 19.6 |
|  |  | (F) Brix(%) | 3.00 | 3.00 | 3.00 | 3.00 | 3.00 |
|  |  | Mass ratio (B)/(A) | 4.46 | 3.45 | 3.07 | 4.76 | 4.39 |
|  |  | Mass ratio (C)/(A) | 0.138 | 0.089 | 0.087 | 0.135 | 0.110 |
|  |  | Mass ratio (D)/(A) | 0.000503 | 0.000157 | 0.000121 | 0.000468 | 0.000306 |
|  |  | Mass ratio (E)/(A) | 0.11 | 0.11 | 0.11 | 0.09 | 0.09 |
|  |  | Ratio (F)/(A) | 0.02 | 0.01 | 0.01 | 0.02 | 0.01 |
|  | Sensory evaluation | Sourness | 5 | 5 | 4 | 5 | 4 |
|  |  | Sweetness | 5 | 5 | 5 | 5 | 5 |
|  |  | Richness | 5 | 5 | 5 | 5 | 5 |
|  |  | Coarseness | 4 | 5 | 5 | 5 | 5 |
|  | Hygroscopicity | Water content (% by mass) | 9 | — | — | 8 | 8 |
|  |  | Appearance | 3 | — | — | 3 | 3 |

[1]Concentrated coffee composition is diluted with water to obtain Brix of 3.0

From Tables 1 to 3, it found that a concentrated coffee composition excellent in taste and flavor balance while having satisfactory sourness, sweetness and richness and less coarseness, can be obtained by controlling the mass ratio of total sugar and chlorogenic acids and the mass ratio of caffeine and chlorogenic acids to fall within predetermined ranges in a concentrated coffee composition having a Brix of 5% or more.

The invention claimed is:

1. A concentrated coffee composition, comprising:
 components (A), (B) and (C);
  (A) at least one chlorogenic acid,
  (B) total sugar, and
  (C) caffeine,
 wherein a mass ratio of the component (A) and the component (B), [(B)/(A)], is from 2.9 to 5,
 wherein a mass ratio of the component (A) and the component (C), [(C)/(A)], is 0.17 or less, and
 wherein a (F) Brix value of the concentrated coffee composition is 5% or more.

2. The concentrated coffee composition according to claim 1, wherein a content of the component (A) in a solution prepared by diluting the concentrated coffee composition with water so as to obtain a Brix value of 3.0% is from 0.1 to 0.5% by mass.

3. The concentrated coffee composition according to claim 1, wherein a content of the component (B) in a solution prepared by diluting the concentrated coffee composition with water so as to obtain a Brix value of 3.0% is from 0.4 to 1.5% by mass.

4. The concentrated coffee composition according to claim 1, wherein a content of the component (C) in a solution prepared by diluting the concentrated coffee composition with water so as to obtain a Brix value of 3.0% is 0.1% by mass or less.

5. The concentrated coffee composition according to claim 1, further comprising hydroxyhydroquinone as a component (D), wherein a mass ratio of the component (D) and the component (A), [(D)/(A)], is $5\times10^{-4}$ or less.

6. The concentrated coffee composition according to claim 1, further comprising hydroxyhydroquinone as a component (D), wherein a mass ratio of the component (D) and the component (A), [(D)/(A)], is $4\times10^{-4}$ or less.

7. The concentrated coffee composition according to claim 1, wherein a proportion of at least one dicaffeoylquinic acid (E) relative to all chlorogenic acids of the component (A), [(E)/(A)], on a mass basis, is from 0.05 to 0.3.

8. The concentrated coffee composition according to claim 1, in the form of liquid, powder, granule or tablet.

9. The concentrated coffee composition according to claim 1, wherein:
- a content of the component (A) in a solution prepared by diluting the concentrated coffee composition with water so as to obtain a Brix value of 3.0% is from 0.1 to 0.5% by mass;
- a content of the component (B) in a solution prepared by diluting the concentrated coffee composition with water so as to obtain a Brix value of 3.0% is from 0.4 to 1.5% by mass; and
- a content of the component (C) in a solution prepared by diluting the concentrated coffee composition with water so as to obtain a Brix value of 3.0% is 0.1% by mass or less.

* * * * *